US006395201B1

(12) United States Patent
Hunt et al.

(10) Patent No.: US 6,395,201 B1
(45) Date of Patent: May 28, 2002

(54) METHOD AND MANUFACTURING AN AUTOMOTIVE REFLECTOR

(75) Inventors: David Oren Hunt, Sandusky; Dale Douglas Owens, Bellevue; Ronald Dennis Polley, Sandusky, all of OH (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/498,392

(22) Filed: Feb. 3, 2000

(51) Int. Cl.[7] .............................................. B29D 11/00
(52) U.S. Cl. .......................... 264/1.9; 264/2.7; 264/163
(58) Field of Search ........................... 264/1.1, 1.7, 1.9, 264/2.7, 163

(56) References Cited

U.S. PATENT DOCUMENTS

| 3,839,129 A | * | 10/1974 | Neumann | 264/1.9 |
|---|---|---|---|---|
| 4,085,248 A | | 4/1978 | Zehender et al. | |
| 4,406,045 A | * | 9/1983 | Schwab | 264/1.9 |
| 4,570,203 A | * | 2/1986 | Daniels et al. | 264/1.9 |
| 4,605,462 A | | 8/1986 | Lehner | |
| 4,668,542 A | | 5/1987 | LeCreff | |
| 4,769,205 A | | 9/1988 | Oles et al. | |
| 4,853,282 A | | 8/1989 | Peerlkamp | |
| 4,992,038 A | | 2/1991 | Furuse et al. | |
| 5,223,315 A | | 6/1993 | Katsura et al. | |
| 5,266,377 A | | 11/1993 | Kinoshita et al. | |
| 5,275,764 A | * | 1/1994 | Hettinga | 264/1.9 |
| 5,833,889 A | * | 11/1998 | Tanikita et al. | 264/1.9 |

FOREIGN PATENT DOCUMENTS

GB   2 187 132 A   2/1987

* cited by examiner

Primary Examiner—Mathieu D. Vargot
(74) Attorney, Agent, or Firm—Steven L. Oberholtzer; Brinks Hofer Gilson & Lione

(57) ABSTRACT

A method of manufacturing an automotive reflector comprising a series of steps. A thin plastic film having a backing material is thermoformed into the rough shape of the reflector. The thermoformed film is called a pre-form. The pre-form has a concave surface and a convex surface. The backing material forms the convex surface. The pre-form is placed within an injection molding press with the concave surface juxtaposed a mold core. Molten reinforced plastic material is injected into the mold adjacent to the backing material. The plastic material heats and fuses to the backing material to form a reflector. After the plastic material has cooled, the reflector is removed from the injection mold as a finished reflector.

16 Claims, 3 Drawing Sheets

METHOD AND MANUFACTURING AN AUTOMOTIVE REFLECTOR

BACKGROUND OF THE INVENTION

1. Field of the Invention

The present invention is directed to a method of manufacturing an automotive reflector. More specifically, the invention is directed to manufacturing an automotive reflector from a thermoformed film having a highly reflective material that is integrally molded into a reflector.

2. Description of the Related Arts

Most automotive reflector assemblies are made from a reflector and a lens. The reflector is injection molded to have a curved shape. The interior of the reflector is metalized to provide a highly reflective coating. The metalized surface is produced in several ways including vacuum deposition, sputter coatings or ion coatings. These coating methods generally require that the reflector be pre-molded and placed within a metalizing chamber. Most chambers are operated under a vacuum and require removing some or all of the air within the chamber. A significant percentage of the metal used in the metalization process falls outside of the reflector. This generally requires the use of protective masks that are fitted over the reflectors to prevent metalization of these outside areas. The method thus described is a batch process that requires loading and unloading the reflectors into a chamber for metalization.

The conventional metalization process is described in U.S. Pat. No. 4,085,248. The interior surface of the reflector requires a highly polished or smooth finish to receive the metalization. This is achieved by either finely polishing the molds or by applying a base coat to the interior surface of the reflector. The metal is deposited on the interior surface of the reflector usually by vacuum deposition. The metal most commonly used in vacuum deposition is aluminum. Because the aluminum surface is subject to oxidation, a protective outer coating is deposited atop the aluminum to maintain the reflectivity of the aluminum coating. It is desirable to produce a reflector without these metalization and coating steps.

It is also desirable to manufacture reflectors from plastic materials that withstand the high temperatures created by the lamp. Currently, most high quality thermoplastic reflectors are made from unfilled-engineered plastic materials such as polycarbonate. These materials are able to both provide the desired high temperature resistance and smooth finish for an optical surface, but they are more expensive than other plastic materials. Plastic materials filled with reinforcing fibers or particles are also known to be able to withstand the higher temperatures, and cost substantially less than the unfilled polycarbonate, but the filler material, usually glass, talc, or mica, causes surface irregularities that degrade the optical performance of the reflector. These materials require a base coat between the plastic reflector and the metalized coating to provide a smooth surface. This additional step may negate the cost savings from the materials selection.

It is also desirable to separate the metalization step from the molding step. The metalization chambers required to produce an optical-quality surface are very expensive. The equipment needed to injection mold the reflector is much more affordable. Rather than shipping bulky metalized reflectors to assembly facilities, it is desirable to manufacture a lightweight pre-form that contains the metalized coating reflective surface. This enables the manufacture of the finished reflector at the final assembly location and permits the greater utilization of the more expensive metalization chambers.

U.S. Pat. No. 5,833,889, teaches a method of making an automotive reflector by first thermoforming a polymeric film to have the shape of the reflector and then injection molding a rigid backing to the film. The backing may include glass reinforcement material that in the absence of the film would degrade the optical coating. The film provides a smooth surface to receive the metalization. The method described in the U.S. Pat. No. 5,822,899 patent still requires a separate metalization step that is avoided by the present process. By incorporating the reflective material into the film prior to forming, the expensive and complicated metalization process is avoided. It is much simpler and less costly to form a flat film to have a reflective surface than applying metal to a curved reflector.

In an unrelated art area, it is known to apply decorative films or appliqués to the exterior surface of molded articles. U.S. Pat. Nos. 5,266,377 and 5,223,315 teach the manufacture of a container having a printed label. The label is placed within the cavity of the mold and then the container is molded within the label. Applying films to the exterior surface of an article is understood because as the article is formed within the mold, it pushes outwardly, stretching the film within the mold. It is not known to manufacture articles having a smooth film surface laminated to the surface of the part. Manufacturing an article having a smooth laminated interior film is more complex because as the article is molded, it tends to collapse the film within the mold. The collapsed film often causes wrinkles, pleats or other unwanted blemishes.

The films used to produce thermoformed pre-forms are generally placed within a rigid frame. The frame retains two or more sides of the film while the film is heated. The film and frame are then placed above or below the mold for thermoforming. A process using frames to thermoform films is described in UK Patent Application No. 6B2187132A and is incorporated herein by reference. The use of frames is again a batch process where the frame receives a length of film. The frame is needed to provide tension to the film as it is thermoformed. It is desirable to provide a method for manufacturing thermoformed films that does not require the use of a frame to retain the film or to provide tension to the film during thermoforming. It is also desirable to provide a method of precisely indexing the film without the need for a frame.

After the film is thermoformed, it produces a pre-form having an offal portion surrounding the pre-form. The offal portion is trimmed in a separate trimming operation and removed from the pre-form. It is desirable to provide a thermoforming process that simultaneously thermoforms and trims the pre-form while retaining the offal portion on a film roll. This enables a continuous thermoforming and trimming process that does not require the separate handling of the offal portion.

These deficiencies and problems are overcome by the present invention.

SUMMARY OF THE INVENTION

The present invention is directed to a method of manufacturing an automotive reflector comprising a series of steps. A thin plastic film having a backing material is thermoformed into the rough shape of the reflector. The thermoformed film is called a pre-form. The pre-form has a concave surface and a convex surface. The backing material forms the convex surface. It is preferable that the film be formed to have a highly reflective surface. This may be achieved by depositing a metal coating to the film using conventional metalization equipment or by incorporating material, either polymeric or metallic, into the film that produces a reflective surface on the film.

The pre-form is placed within an injection molding press with the concave reflector surface juxtaposed a mold core. Molten plastic material is injected into the mold adjacent to the backing material. The plastic material heats and fuses to the backing material to form a reflector. After the plastic material has cooled, the reflector is removed from the injection mold as a finished reflector.

In an alternative embodiment of the present invention, the thermoforming operation may simultaneously form and trim the film. This is especially useful when using films that have a reflective surface and the offal portion is not needed as a mask. In this alternative embodiment, the film is retailed between rollers and thermoformed in the desired shape. The thermoforming press includes cutting blades that trim the film to the desired shape when the mold is moved to a closed position.

This alternative embodiment enables the manufacture of a reflector without the need for a separate metalization step. The film has a highly reflective material that provides the reflectivity necessary for automotive reflectors. It is thermoformed into the rough shape of the finished reflector and integrally molded with plastic material in a process described as insert molding.

Utilizing a coiled film stock further enhances the manufacturing method. The film stock is indexed using a sprocketed roller. The film is thermoformed into a pre-form while the sprockets retain the film perimeter. The thermoforming step simultaneously forms the film into a pre-form and trims and or severs the perimeter of the pre-form from the remainder of the film. The pre-form is removed from the film leaving blanks. The film surrounding the blanks constitutes the offal portion of the film and is taken up by a take-up spool.

The process eliminates the need for a frame to retain the film. The process also eliminates separately collecting the offal portion from the trimmed pre-form.

These and other objects, features, and advantages of the present invention will become more readily apparent when viewed in connection with the accompanying drawings wherein like reference numbers correspond to like components.

DETAILED DESCRIPTION OF THE PREFERRED EMBODIMENTS

Figure 1:
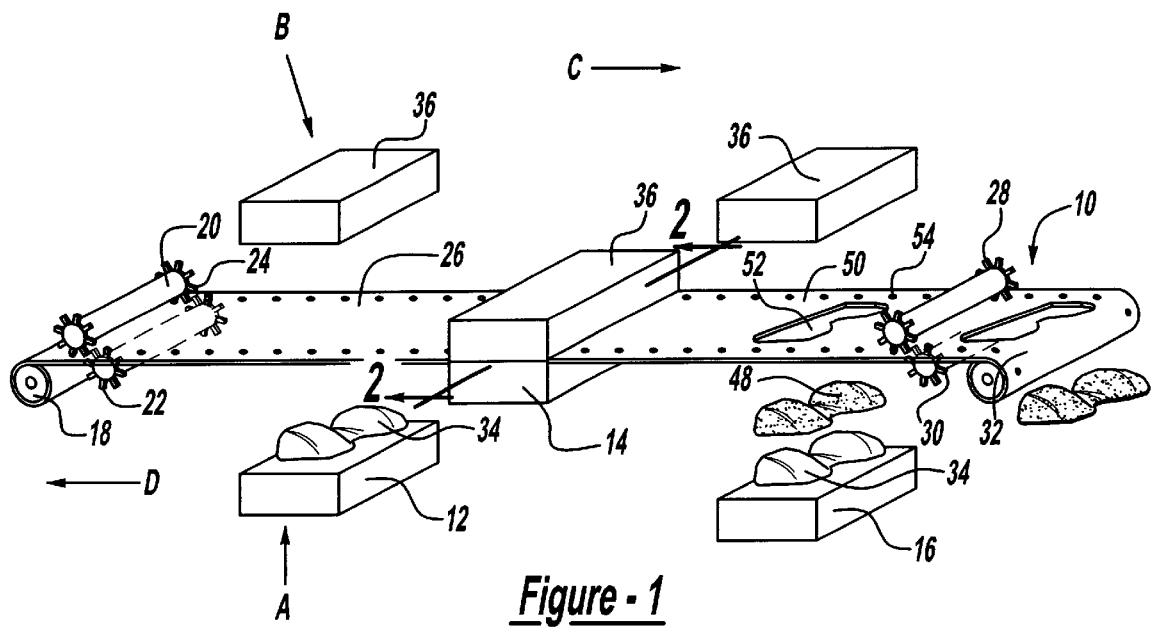
FIG. 1 is a perspective view of the thermoforming and trimming apparatus used in the present invention.

The present invention will be described through a series of drawings, which illustrate the thermoforming and injection molding operation claimed. The drawings describe a thermoforming station that operates without the need of a separate frame; however, the design may also be used with a conventional thermoforming apparatus. The invention will also be described as a method of manufacturing a headlamp reflector, however other reflectors may also be manufactured using the same or similar process, technique and equipment, and are included within the invention described herein.

The following items are a word list of the items described in the drawings and are reproduced to aid in understanding the invention;

10 thermoforming and trimming apparatus
12, 14, 16 thermoforming stations
18 film roll
20, 22 sprocketed rollers
24 teeth
26 film
28, 30 sprocketed rollers
32 take-up spool
34 mold
36 closure member
38 reflective surface
40 backing material
42 vacuum line
44 positive pressure lines
46 knife edge
48 pre-form
50 offal portion
52 blank
54 perforated edge portion
56 loading machine
58 injection molding machine
60 core
62 cavity
64 concave surface
66 convex surface
68 gates
70 plastic material
72 reflector Illustrated in FIG. 1 is a perspective view of a thermoforming and trimming apparatus 10. The apparatus 10 utilizes a film having a highly reflective surface. The apparatus 10 comprises three thermoforming and trimming stations 12, 14 and 16. While the apparatus 10 is illustrated with three thermoforming stations, one station is sufficient. Multiple thermoforming stations reduced the cycle time and increase the throughput of the apparatus 10. The apparatus 10 receives a film roll 18. As will be described in more detail below, the film roll 18 includes a reflective surface and a backing material. The leading edge of the film roll 18 is fed between sprocketed rollers 20, 22. Teeth 24 on the rollers 20, 22 pierce the peripheral portion of a film 26. This first set of rollers 20, 22 serve to index the film 26 through the apparatus 10. At this initial juncture, the thermoforming stations 12, 14 and 16 are not operating. The film 26 is fed through a second series of sprocketed rollers 28, 30. The film 26 is retained tautly between the first set of rollers 20, 22 and the second set of rollers 28, 30. A take-up spool 32 serves to coil the film 26 after having passed through the thermoforming stations 12, 14 and 16.

The first set of rollers 20, 22 are heated and render the film 26 pliable. Other methods of heating the film 26 are also possible such as convection, radiant, dielectric or microwave heating. The pliable film 26 is indexed to thermoforming station 12. The thermoforming station 12 includes a mold 34 having a curved shape that corresponds to the desired concave surface of the finished reflector. The thermoforming station 12 is raised in the direction A until the mold 34 contacts the reflective surface of the film 26. The closure member 36 is moved in the downward direction B. The mold 34 and the closure member 36 meet as shown at thermoforming station 14.

Figure 2:
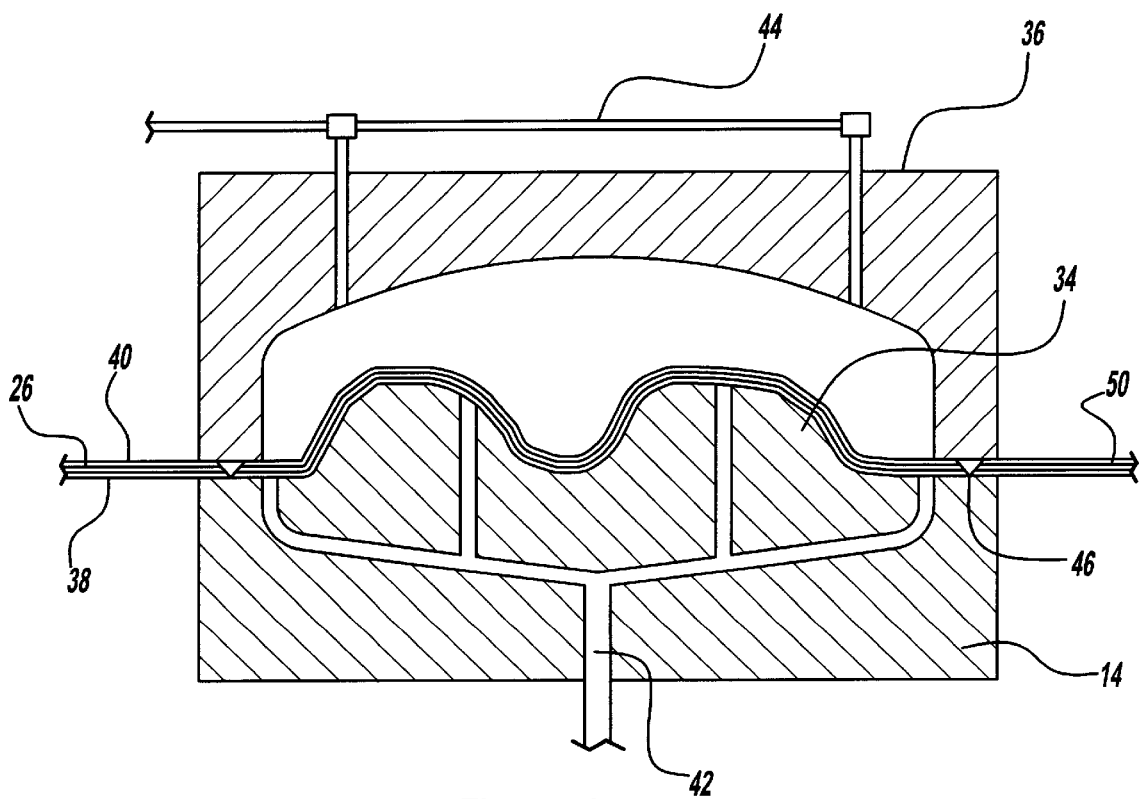
FIG. 2 is a cross-sectional view of the thermoforming station illustrated in FIG. 1 taken along the lines 2—2.
Figure 3:
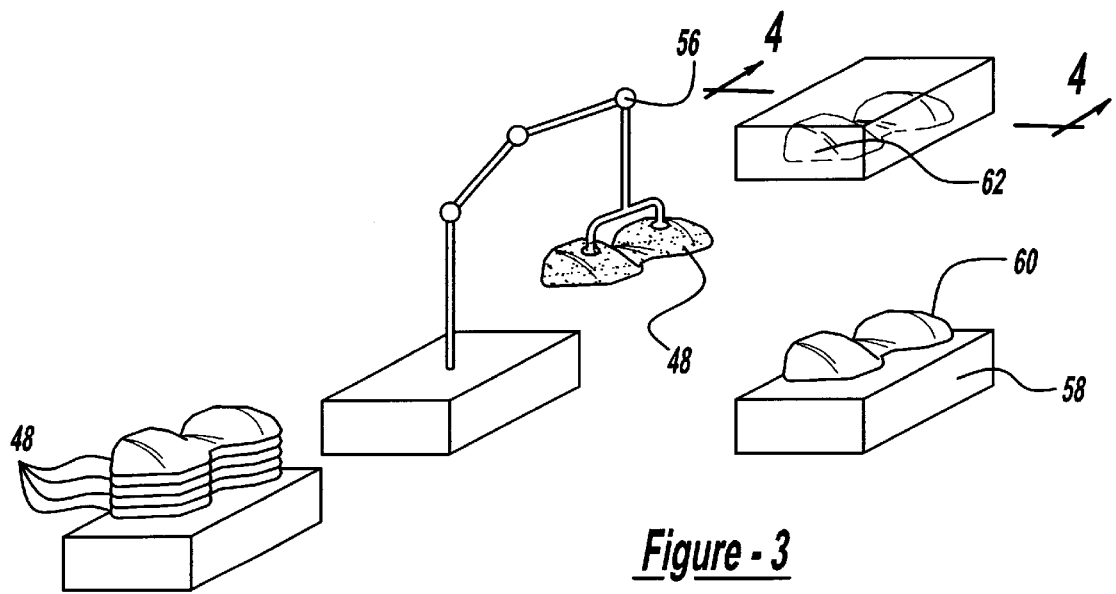
FIG. 3 is a perspective view of a film loading station.

Illustrated in FIG. 2 is an enlarged cross-sectional view of the thermoforming station 14 taken along lines 2—2 in FIG. 1. The film 26 includes a reflective surface 38 and a backing material 40. The reflective surface 38 may be made integrally formed to be reflective, as an applied coating, or the surface may be a separate layer bonded to or deposited on the film 26. The reflective surface 38 may be made from a variety of materials including deposited metals such as aluminum, nickel, tin or chrome. It is also possible to coat the film 26 with a non-metallic coating and render it highly reflective—or to include these reflective materials within the film 26. The backing material 40 is made from a thermoplastic polymer that fuses to the molten plastic as will be described below. A large variety of films and materials may be used to produce the film 26 including those taught in U.S. Pat. Nos. 4,446,055, 4,446,172, 4,385,804, and 4,906,084, all of which are incorporated herein by reference.

The thermoforming station 14 contacts the mold 34 with the pliable film 26. The film 26 is trapped between the thermoforming station 14 and the closure member 36. A vacuum is applied through vacuum lines 42 to draw the film 26 tightly against the mold 34. Optionally, positive pressure lines 44 apply a positive pressure within the closure member 36 to force the film 26 against the mold 34. A knife-edge 46 around the perimeter of the closure member 36 trims the film 26 into the desired shape.

The thermoforming stations 12, 14 and 16 are identical and rotate between the three positions illustrated. Multiple stations are used to reduce the cycle time and increase the throughput of the apparatus 10. The thermoforming station 14 transforms the film 26 into a pre-form 48 by thermoforming it into the desired shape and trimming the offal portion 50 as shown in FIG. 1. The pre-form 48 requires a period of residency on the mold 34. The thermoforming station 14 moves in the direction C at the same speed as the film 26. The thermoforming station 14 and the film 26 are indexed until they reach the thermoforming station 16. The thermoforming station 14 becomes the thermoforming station 16. The time required to index from thermoforming station 14 to thermoforming station 16 is sufficient to thermoform the pre-form 48 into its final shape. The closure member 36 is moved upwardly and the thermoforming station 16 is moved downwardly. The pre-form 48 remains on the mold 34 until an operator removes it. The thermoforming station 16 cycles in the direction D until it reaches the thermoforming station 12 again.

The trimming operation leaves a series of blanks 52 corresponding to the area of the pre-form 48. The offal portion 50 surrounds the blank 52. Because the perforated edge portion 54 is continuous, the offal portion 50 is coiled by the take-up spool 32.

The apparatus 10 illustrated in FIGS. 1 and 2 does not require a frame to retain the film 26. The film 26 is retained tautly between rollers 20, 22 and 28, 30. The process of thermoforming and trimming the pre-form 48 operates continuously.

Figure 4:
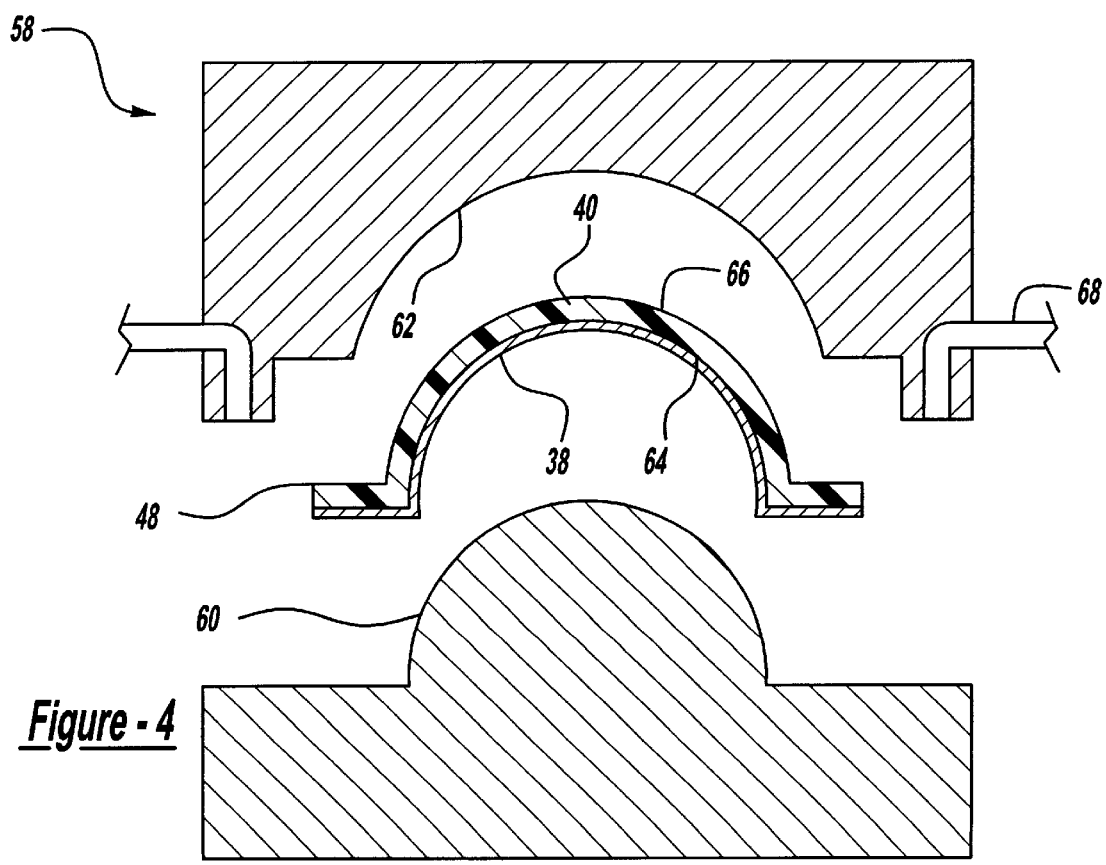
FIG. 4 is a cross-sectional exploded view of the injection mold apparatus illustrated in FIG. 3 taken along the lines 4—4.
Figure 5:
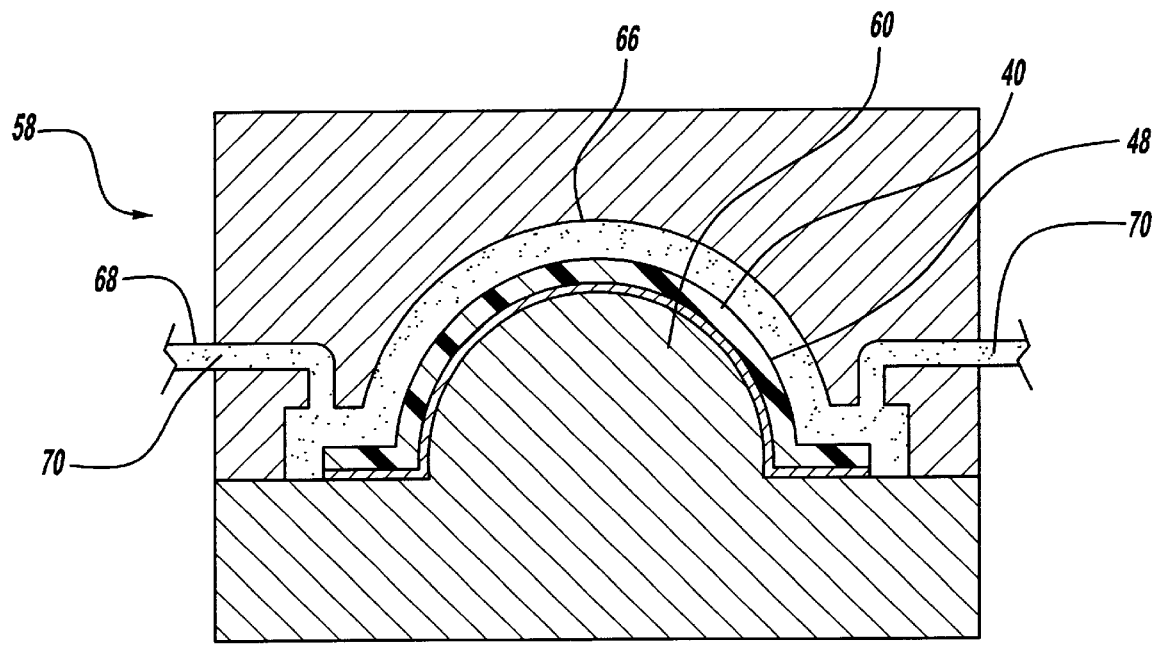
FIG. 5 is the injection mold apparatus illustrated in FIG. 4 in the closed position.

After the thermoforming step shown in FIGS. 1 and 2, the pre-forms 48 are stacked as illustrated in FIGS. 4 and 5. A robotically controlled loading machine 56 transfers the pre-forms 48 into an injection molding machine 58. The construction and operation of the loading machine 56 is described in commonly assigned U.S. patent application Ser. No. 08/903,523, filed Jul. 30, 1997 and incorporated herein by reference. The injection molding machine 58 includes a lower mold having a core 60 and an upper mold having a cavity 62. The pre-form 48 is formed to have a concave surface 64 and a convex surface 66. The concave surface 64 includes the reflective surface 38. The convex surface 66 includes the backing material 40. The pre-form 48 is placed within the injection molding machine 58 with the concave surface 64 juxtaposed the core 60. The injection molding machine 58 is moved to a closed position as illustrated in FIG. 5.

Figure 6:
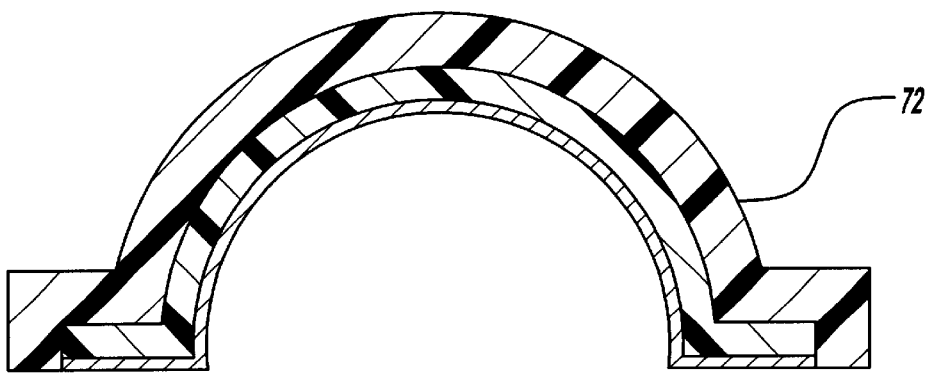
FIG. 6 is a cross-sectional view of the reflector.

The pre-form 48 is sized to be snugly fit atop the core 60. It is preferable that there is little or no space between the pre-form 48 and the core 60. It may be desirable to form the pre-form 48 slightly smaller than the core 60 so that during the injection molding step, the pre-form 48 is stretched over the core 60. Molten plastic material 70 is injected through gates 68 and urges the pre-form 48 against the core 60. The molten plastic material 70 causes the backing material 40 to heat and soften. The softened backing material 40 fuses to the plastic material 70 to form the finished reflector 72 as illustrated in FIG. 6. The molten plastic material 70 is allowed to cool and the core 60 and cavity 62 are moved to an open position and the reflector 72 is removed.

While a wide variety of materials may be used for the molten plastic material, it is preferable to utilize a filled thermoplastic material such as polycarbonate. Filled polycarbonate is low cost and resistant to high temperatures. Common fillers for plastic resins include glass, talc, carbon, mica and wood. Unfortunately, it forms a coarse surface. The coarse surface does not produce a reflector of high quality. The coarse nature of the filled plastic material does not degrade the performance of the reflector because the film reflective surface retains its smooth appearance after the molding operation.

The invention has been illustrated as a method of manufacturing an automotive headlamp assembly. Other reflectors may be manufactured using the same process and equipment. The invention has also been described using an integrated thermoforming and trimming apparatus that does not require the use of a separate frame to retain the film. Traditional thermoforming devices may be utilized to manufacture the pre-form.

While the best modes for carrying out the invention have been described in detail, those familiar with the art to which this invention relates will recognize various alternative designs and embodiments for practicing the invention as defined by the following claims.

What is claimed:

1. A method of manufacturing a reflector comprising the steps of:
   providing a thermoformable film having a highly reflective surface and a backing material;
   forming said film into a shape of a reflector;
   placing said film in an injection mold wherein said reflective surface is adjacent a core in said mold;
   injecting a plastic material into said mold adjacent to said backing material; and
   heating and fusing said plastic material to said backing material to form said reflector.

2. The method of claim 1, wherein said film has an offal portion and further comprising the step of trimming said offal portion prior to said placing step.

3. The method of claim 1, wherein said plastic material contains reinforcement materials.

4. The method of claim 3, wherein said plastic material is polycarbonate and said reinforcement material is glass.

5. A method of manufacturing an automotive reflector comprising the steps of:

providing a film having a highly reflective surface and a backing surface;

thermoforming said film to a preform having a curved shape, wherein said reflective surface forms a concave surface and said backing surface forms a convex surface;

placing said film in an injection mold having a core, said core mating with said concave surface;

injecting a plastic material into said mold adjacent said backing surface heating and fusing said plastic material to said backing material to form said reflector; and cooling said plastic material and removing said reflector.

6. The method of claim 5, further comprising trimming said pre-form during said thermoforming.

7. The method of claim 5, wherein said film is coiled into a roll and further comprising the step of trimming said film to form said pre-form and retaining an offal portion of said film on said roll.

8. The method of claim 7, wherein said roll is indexed by sprocketed rollers.

9. The method of claim 8, wherein said sprocketed rollers perforate an edge of said film.

10. The method of claim 9, further comprising heating said rollers to heat and soften said film.

11. The method of claim 5, further providing a thermoforming mold that contacts said film and forms said pre-form.

12. The method of claim 11, and further comprising moving said mold with said film during said thermoforming.

13. The method of claim 5, further comprising drawing a vacuum through said mold to draw said film against said mold.

14. The method of claim 5, further comprising the step of providing a closure member juxtaposed the mold and applying a positive pressure through said closure member to push said film against said mold.

15. The method of claim 14, further comprising severing the film between said closure member and said mold.

16. The method of claim 7, further comprising the step of rolling said offal portion into a coil.

* * * * *

UNITED STATES PATENT AND TRADEMARK OFFICE
CERTIFICATE OF CORRECTION

PATENT NO.    : 6,395,201 B1
DATED         : May 28, 2002
INVENTOR(S)   : David Oren Hunt et al.

It is certified that error appears in the above-identified patent and that said Letters Patent is hereby corrected as shown below:

<u>Title page, Item [54] and Column 1 and line 1,</u>
Delete "AND" and substitute -- FOR -- in its place.

<u>Column 7,</u>
Line 11, after "surface" insert -- ; -- (semicolon), and start a new paragraph with the word "heating".

Signed and Sealed this

Thirty-first Day of December, 2002

JAMES E. ROGAN
*Director of the United States Patent and Trademark Office*